US00RE44167E

(19) United States
(12) Reissued Patent
Lee

(10) Patent Number: US RE44,167 E
(45) Date of Reissued Patent: Apr. 23, 2013

(54) WIDE VIEWING ANGLE LIQUID CRYSTAL DISPLAY COMPRISING AT LEAST ONE FLOATING ELECTRODE IN LOCATIONS FACING CORRESPONDING ONE OR MORE PIXEL ELECTRODES WITH LIQUID CRYSTAL LAYER THEREBETWEEN

(75) Inventor: Seok-Lyul Lee, Hsinchu (TW)

(73) Assignee: Au Optronics Corporation, Hsinchu (TW)

(21) Appl. No.: 13/411,371

(22) Filed: Mar. 2, 2012

Related U.S. Patent Documents

Reissue of:
(64) Patent No.: 7,924,385
Issued: Apr. 12, 2011
Appl. No.: 11/945,109
Filed: Nov. 26, 2007

(51) Int. Cl.
*G02F 1/1343* (2006.01)

(52) U.S. Cl.
USPC ..... 349/141

(58) Field of Classification Search ..... 349/141
See application file for complete search history.

(56) References Cited

U.S. PATENT DOCUMENTS

| | | | | |
|---|---|---|---|---|
| 4,978,203 | A | 12/1990 | Yamazaki et al. | |
| 6,201,589 | B1 | 3/2001 | Tombling et al. | |
| 6,356,331 | B1 | 3/2002 | Ono et al. | |
| 6,583,836 | B2 | 6/2003 | Kim et al. | |
| 6,587,170 | B2 | 7/2003 | Shin et al. | |
| 6,678,027 | B2 | 1/2004 | Park et al. | |
| 6,741,311 | B1 | 5/2004 | Hong et al. | |
| 6,798,483 | B2 | 9/2004 | Lee et al. | |
| 6,819,389 | B2 | 11/2004 | Imayama et al. | |
| 6,822,716 | B2 | 11/2004 | Lee et al. | |
| 6,890,783 | B2 | 5/2005 | Kimura et al. | |
| 6,924,863 | B2 | 8/2005 | Nishida et al. | |
| 7,009,664 | B2 | 3/2006 | Imayama et al. | |
| 7,113,243 | B2 | 9/2006 | Jeong et al. | |
| 7,161,649 | B2 | 1/2007 | Lee et al. | |
| 7,256,843 | B2 | 8/2007 | Iwakabe et al. | |
| 7,259,820 | B2 | 8/2007 | Matsumoto | |
| 7,557,882 | B2 | 7/2009 | Kobayashi et al. | |
| 7,932,980 | B2 | 4/2011 | Ge et al. | |
| 2001/0019388 | A1* | 9/2001 | Kim et al. | 349/129 |
| 2002/0003597 | A1* | 1/2002 | Shin et al. | 349/110 |
| 2004/0109120 | A1 | 6/2004 | Lee et al. | |
| 2004/0263749 | A1 | 12/2004 | Jeong et al. | |
| 2007/0115417 | A1 | 5/2007 | Ge et al. | |
| 2007/0211199 | A1 | 9/2007 | Kobayashi et al. | |

FOREIGN PATENT DOCUMENTS

| | | | |
|---|---|---|---|
| JP | 2000275664 | A | 10/2000 |
| KR | 20020044288 | A | 6/2002 |
| TW | 538273 | B | 6/2003 |

* cited by examiner

*Primary Examiner* — Edward Glick
*Assistant Examiner* — Dennis Y Kim
(74) *Attorney, Agent, or Firm* — Morris Manning & Martin LLP; Tim Tingkang Xia, Esq.

(57) ABSTRACT

A liquid crystal display (LCD) device. In one embodiment, the LCD device includes a first substrate and a second substrate positioned apart from the first substrate, a liquid crystal layer positioned between the first substrate and the second substrate, and a plurality of pixels. Each pixel includes two or more first common electrodes and one or more pixel electrodes formed on the first substrate, where each of the one or more pixel electrodes is located between two of the two or more first common electrodes. Each pixel further includes one or more floating electrodes and/or two or more second electrodes formed on the second substrate in locations opposite corresponding ones of the one or more pixel electrodes and the two or more first common electrodes on the first substrate.

25 Claims, 9 Drawing Sheets

(a)

(b)

WIDE VIEWING ANGLE LIQUID CRYSTAL DISPLAY COMPRISING AT LEAST ONE FLOATING ELECTRODE IN LOCATIONS FACING CORRESPONDING ONE OR MORE PIXEL ELECTRODES WITH LIQUID CRYSTAL LAYER THEREBETWEEN

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a reissue of U.S. Pat. No. 7,924,385, issued Apr. 12, 2011.*

FIELD OF THE INVENTION

The present invention relates generally to a liquid crystal display (LCD) device, and more particularly to an LCD device that utilizes floating electrode switching (FES) to improve image quality with viewing angle characteristic and light transmittance of display.

BACKGROUND OF THE INVENTION

Liquid crystal display (LCD) is commonly used as a display device because of its capability of displaying images with good quality while using little power. An LCD apparatus includes an LCD panel formed with liquid crystal cells and pixel elements with each associating with a corresponding liquid crystal cell and having a liquid crystal capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Liquid crystal molecules have a definite orientational alignment as a result of their long, thin shapes. The orientations of liquid crystal molecules in liquid crystal cells of an LCD panel play a crucial role in the transmittance of light therethrough. For example, in a twist nematic LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. The limited viewing angle of LCDs is one of the major disadvantages associated with the LCDs and is a major factor in restricting applications of the LCDs.

Several approaches exist for increasing the viewing angles of LCDs, such as in-plane switching (IPS), and fringe field switching (FFS). As shown in FIG. 9(a) an IPS mode LCD 910 has a structure that two pixel electrodes 921 and a common electrode 929, both for driving liquid crystal molecules 932, are formed on a first substrate 920 in parallel. When a voltage is applied to the pixel electrodes 921 and the common electrode 929, an electric field 937 is generated in-plane to the surface of the first substrate 920. In the IPS mode LCD 910, a distance, $L_1$, defined between the common electrode 929 and the pixel electrode 921 is about the same order as a cell gap, $d_1$, defined between the first substrate 920 and the second substrate 940. The IPS mode LCD 920 has the advantage of viewing angle that is wider than the conventional TN mode LCD. However, since the pixel and the common electrodes 921 and 929 are made of opaque metal films, there is a limitation in aperture ratio and transmittance of light 945. In addition, due to the planar electric field structure, the IPS mode LCD inherently suffers from severe image sticking.

In order to overcome the limitation of the IPS mode LCD in aperture ratio and transmittance of light, an FFS mode LCD is introduced. In the FFS mode LCD 950, as shown in FIG. 9(b), a plurality of pixel electrodes 961 and a common electrode 969 are made of transparent metal films, for example, indium tin oxide metal films, thereby improving the aperture ratio compared to the IPS mode LCD. Furthermore, a distance, $L_2$, defined between two pixel electrodes is narrower than that a cell gap, $d_2$, defined between the first substrate 970 and the second substrate 990. When a voltage is applied between the pixel electrodes 961 and 969, a fringe field 981 is generated in a region of the cell gap adjacent to the common and the pixel electrodes 961 and 969, liquid crystal molecules 982 disposed within the region are all driven, thereby improving the transmittance of light 995, comparing to the IPS mode LCD.

However, in the IPS mode LCD and the FFS mode LCD, no conductive metal films are formed on the second substrate for preventing distortion of the electric field generated by the pixel electrode and the common electrode on the first substrate. Usually, an ITO film is formed on the back side of the second substrate to protect the LCD from electro-static damage, which makes increase manufacture cost and material cost of a color filter.

Therefore, a heretofore unaddressed need exists in the art to address the aforementioned deficiencies and inadequacies.

SUMMARY OF THE INVENTION

The present invention, in one aspect, relates to an LCD device. In one embodiment, the LCD device has a first structure and a second structure positioned apart to define a cell gap therebetween, and a liquid crystal layer positioned in the cell gap between the first structure and the second structure. In one embodiment, the liquid crystal layer comprises nematic liquid crystals having a positive dielectric anisotropy. The liquid crystals are selected such that a product of the refractive index $\delta_n$ of the liquid crystals and the cell gap is in a range of about 0.15-0.60 um.

The first structure includes a first substrate having a first surface and an opposite, second surface defining a body portion therebetween; a plurality of scanning lines spacing-regularly formed on the second surface of the first substrate along a first direction; an insulation layer formed on the first substrate covering the plurality of scanning lines; a plurality of signal lines spacing-regularly formed on the insulation layer crossing over the plurality of scanning lines along a second direction that is substantially perpendicular to the first direction; a passivation layer formed on the insulation layer covering the plurality of signal lines thereon; a plurality of first common electrodes spacing-regularly formed on the passivation layer along the second direction; and a plurality of pixel electrodes spacing-regularly formed on the passivation layer along the second direction, each pixel electrode located between two neighboring first common electrodes.

In one embodiment, each pixel electrode and one of its two neighboring first common electrodes define a distance therebetween, which is greater than the cell gap.

In one embodiment, each of the plurality of first common electrodes is located over a corresponding one of the plurality of date lines. In another embodiment, each pair of the plurality of first common electrodes is distantly located over a corresponding one of the plurality of date lines.

The second structure includes a second substrate having a first surface and an opposite, second surface defining a body portion therebetween; a black matrix formed on the first surface of the second substrate in a predetermined pattern; a color filter layer formed on the remaining portion of the second substrate; an overcoat layer formed on the color filter layer and the black matrix; a plurality of second common electrodes spacing-regularly formed on the overcoat layer along the second direction; and a plurality of floating electrodes spacing-regularly formed on the overcoat layer along the second direction, each floating electrode located between two neighboring second common electrodes.

The first structure and the second structure are positioned relative to each other such that a cell gap is defined therebetween; each of the plurality of floating electrodes in the second structure is positioned opposite a corresponding one of the plurality of pixel electrodes in the first structure; each of the plurality of second common electrodes in the second structure is positioned opposite a corresponding one of the plurality of first common electrodes in the first structure, and the black matrix in the second structure is positioned opposite the plurality of scanning lines and the plurality of signal lines in the first structure, respectively.

Each of the plurality of pixel electrodes, the plurality of floating electrodes, the plurality of first common electrodes and the plurality of second common electrodes is formed of a transparent, conductive material including indium zinc oxide (IZO), amorphous indium tin oxide (ITO), poly ITO, or any combination of them, with a thickness in the range of about 0.01-3.0 μm.

In one embodiment, the first structure further comprises a first alignment layer formed on the passivation layer covering the plurality of pixel electrodes and the plurality of first common electrodes thereon, and wherein the second structure further comprises a second alignment layer formed on the overcoat layer covering the plurality of floating electrodes and the plurality of second common electrodes thereon. Each of the first alignment layer and the second alignment layer is formed to have a rubbing axis with a pre-tilted angle in a range of about 0-10 degrees relative to the second direction so as to align the liquid crystals to a desired direction.

Additionally, the LCD device further includes a polarizer formed on the first surface of the first substrate, the polarizer having a polarizing axis in a first predetermined direction, the polarizing axis being optically related to the liquid crystal layer; and an analyzer formed on the second surface of the second substrate, the analyzer having an absorbing axis in a second predetermined direction, the absorbing axis being optically related to the polarizer. The polarizing axis of the polarizer and the rubbing axis of the first alignment layer define an angle in a range of about 0-90 degrees, and wherein the polarizing axis of the polarizer is about 90 degrees relative to the absorbing axis of the analyzer.

In another aspect, the present invention relates to an LCD device. In one embodiment, the LCD device includes a first substrate and a second substrate positioned apart to define a cell gap therebetween; a liquid crystal layer positioned in the cell gap between the first substrate and the second substrate; a plurality of scanning lines formed on the first substrate along a first direction and a plurality of signal lines formed on the first substrate crossing over the plurality of scanning lines along a second direction that is perpendicular to the first direction; and a plurality of pixels.

Each pixel is defined between two neighboring scanning lines and two neighboring signal lines crossing over the two neighboring scanning lines and comprises an insulation layer formed on the first substrate; two or more first common electrodes formed on the insulation layer along the second direction, two of the two or more first common electrodes located over the two neighboring signal lines, respectively; one or more pixel electrodes formed on the insulation layer between the two of the two or more first common electrodes along the second direction; a black matrix formed on the second substrate in locations opposite the two neighboring scanning lines and the two neighboring signal lines crossing over the two neighboring scanning lines in the first substrate; a color filter layer formed on the second substrate in an area surrounded by the black matrix; an overcoat layer formed on the black matrix and the color filter; and at least one of one or more floating electrodes and two or more second electrodes formed on the overcoat layer along the second direction in locations opposite corresponding ones of the one or more pixel electrodes and the two or more first common electrodes in the first substrate.

Furthermore, each pixel includes a switch device electrically coupled with the one or more pixel electrodes.

Moreover, each pixel includes a first alignment layer formed on the passivation layer covering the plurality of pixel electrodes and the plurality of first common electrodes thereon; and a second alignment layer formed on the overcoat layer covering the plurality of floating electrodes and the plurality of second common electrodes thereon. Each of the first alignment layer and the second alignment layer is formed to have a rubbing axis with a pre-tilted angle in a range of about 0-10 degrees relative to the second direction so as to align the liquid crystals to a desired direction.

In one embodiment, the LCD device further includes a polarizer formed on an exterior surface of the first substrate, the polarizer having a polarizing axis in a first predetermined direction, the polarizing axis being optically related to the liquid crystal layer; and an analyzer formed on an exterior of the second substrate, the analyzer having an absorbing axis in a second predetermined direction, the absorbing axis being optically related to the polarizer, where the polarizing axis of the polarizer and the rubbing axis of the first alignment layer define an angle in a range of about 0-90 degrees, and the polarizing axis of the polarizer is about 90 degrees relative to the absorbing axis of the analyzer.

In one embodiment, the liquid crystal layer comprises nematic liquid crystals having a positive dielectric anisotropy. The liquid crystals are selected such that a product of the refractive index $\delta_n$ of the liquid crystals and the cell gap is in a range of about 0.15-0.60 um.

In yet another aspect, the present invention relates to an LCD device. In one embodiment, the LCD device includes a first substrate and a second substrate positioned apart from the first substrate; a liquid crystal layer positioned between the first substrate and the second substrate; and a plurality of pixels. Each pixel has two or more first common electrodes formed on the first substrate; one or more pixel electrodes formed on the first substrate, each of the one or more pixel electrodes located between two of the two or more first common electrodes; and at least one of one or more floating electrodes and two or more second electrodes formed on the second substrate in locations opposite corresponding ones of the one or more pixel electrodes and the two or more first common electrodes in the first substrate.

Each pixel further includes a switch device electrically coupled with the one or more pixel electrodes. In one embodiment, each pixel may also includes a first alignment layer formed on the plurality of pixel electrodes and the plurality of first common electrodes thereon; and a second alignment layer formed on the plurality of floating electrodes and the plurality of second common electrodes thereon. Each of the first alignment layer and the second alignment layer is formed to have a rubbing axis with a pre-tilted angle in a range of about 0-10 degrees relative to the direction of the one or more pixel electrodes so as to align the liquid crystals to a desired direction.

In a further aspect, the present invention relates to a liquid crystal display (LCD) device. In one embodiment, the LCD has a first substrate and a second substrate positioned apart from the first substrate; a liquid crystal layer positioned between the first substrate and the second substrate; and a plurality of pixels. Each pixel includes two or more first common electrodes formed on the first substrate; one or more pixel electrodes formed on the first substrate, each of the one or more pixel electrodes located between two of the two or more first common electrodes; and at least one floating electrode formed on the second substrate in locations opposite corresponding one of the one or more pixel electrodes on the first substrate.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
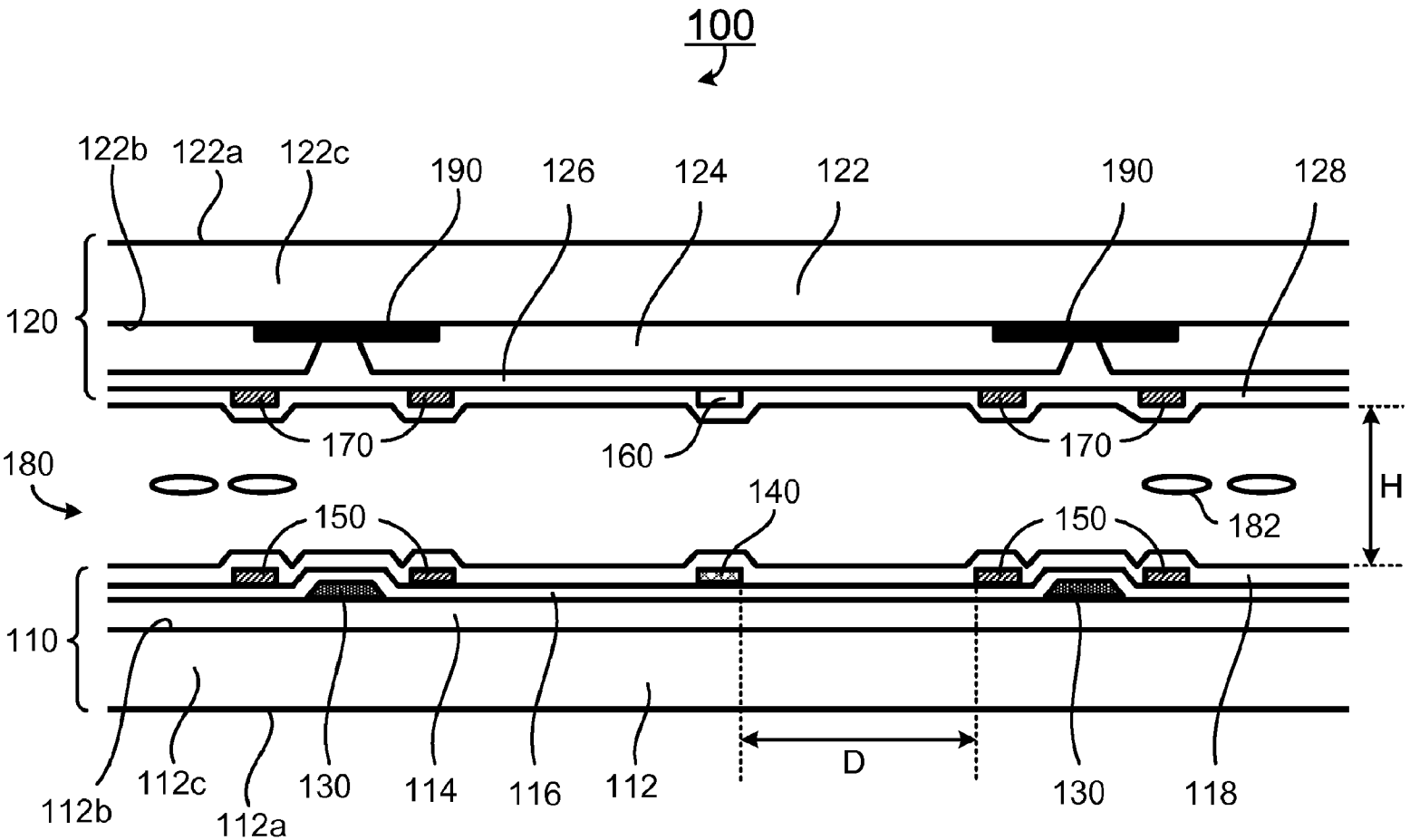
FIG. 1 shows schematically a cross-sectional view of an LCD device according to one embodiment of the present invention.
Figure 2:
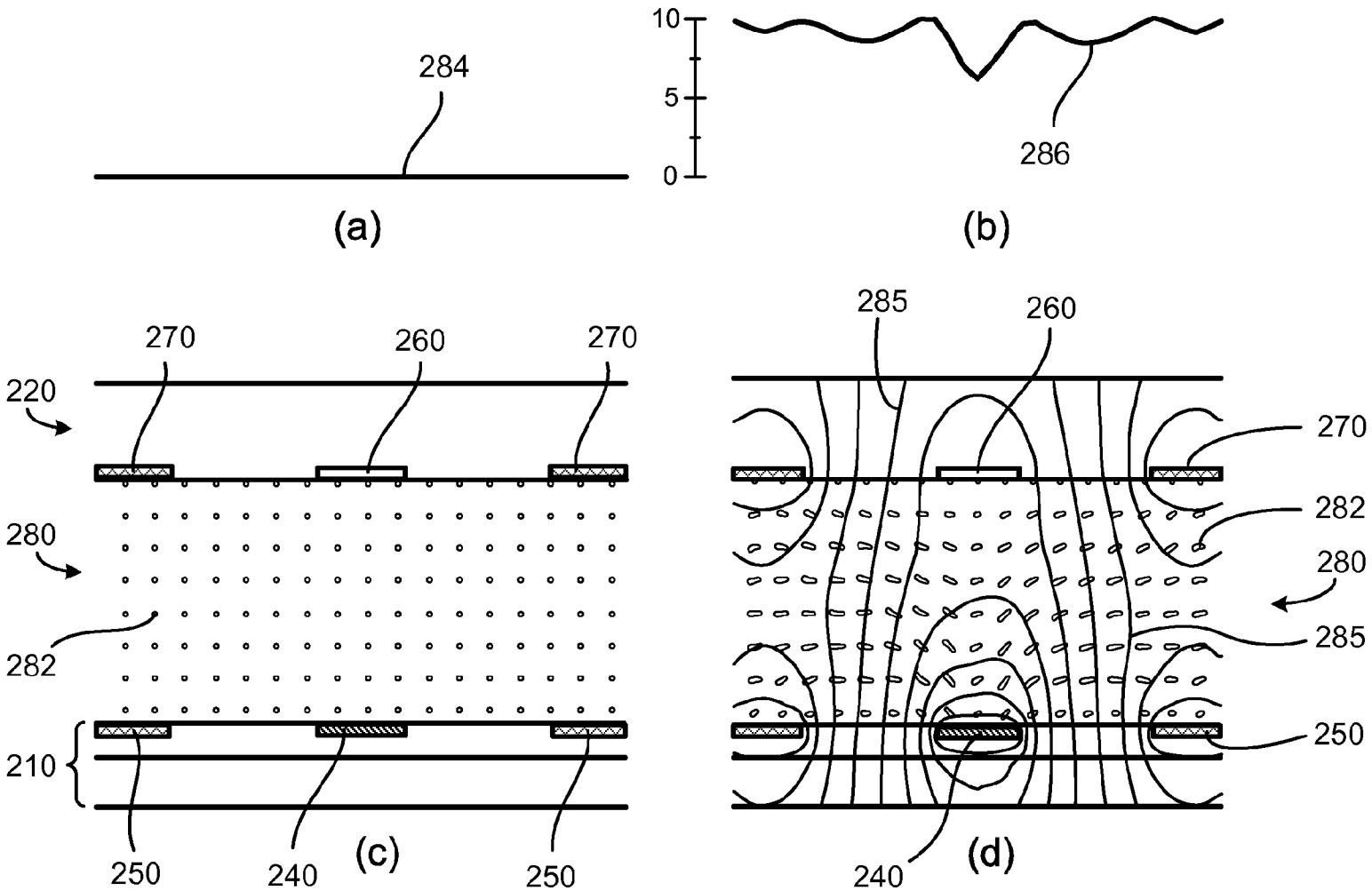
FIG. 2 shows schematically (a) and (b) light transmittance curves of an LCD device, and (c) and (d) cross-sectional views of the LCD device showing an electric field generated in the liquid crystal layer according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-8. In accordance with the purposes of this invention, as embodied and broadly described herein, this invention, in one aspect, relates to an LCD device that utilizes floating electrode switching (FES) to improve image quality with viewing angle characteristic and light transmittance of display.

Referring to FIG. 1, an LCD device 100 is schematically shown according to one embodiment of the present invention. In this exemplary embodiment, the LCD device 100 includes a first structure 110 and a second structure 120 positioned apart to define a cell gap, H, therebetween, and a liquid crystal layer 180 positioned in the cell gap H between the first structure 110 and the second structure 120.

The liquid crystal layer 180 is filled with liquid crystal molecules 182. In one embodiment, the liquid crystals 182 include a liquid crystal material having a positive dielectric anisotropy, such as twisted nematic (TN) liquid crystals, for example. The liquid crystals 182 are selected such that a product of the refractive index $\delta_n$ of the liquid crystals and the cell gap H is in a range of about 0.15-0.60 um.

The first structure 110 includes a first substrate 112, an insulation layer 114, a passivation layer 116, a first alignment layer 118, a plurality of pixel electrodes 140, a plurality of common electrodes 150, a plurality of scanning lines (not shown) and a plurality of signal lines 130.

The first substrate 112 has a first surface 112a and an opposite, second surface 112b defining a body portion 112c therebetween. The plurality of scanning lines is spacing-regularly formed on the second surface 112b of the first substrate 112 along a first direction. The insulation layer 114 is formed on the second surface 112b of the first substrate 112 to cover the plurality of scanning lines thereon. The plurality of signal lines 130 are spacing-regularly formed on the insulation layer 114 crossing over the plurality of scanning lines in a second direction that is substantially perpendicular to the first direction. Accordingly, the plurality of scanning lines and the plurality of signal lines 130 are electrically insulated by the insulation layer 114. On the insulation layer 114, the passivation layer 116 is formed to cover the plurality of signal lines 130 thereon. The plurality of scanning lines and the plurality of signal lines 130 define a plurality of pixels therewith. In one embodiment, the plurality of pixels is arranged in a matrix. The first direction corresponds to the row direction of the pixel matrix, while the second direction corresponds to the column direction of the pixel matrix.

The plurality of first common electrodes 150 and the plurality of pixel electrodes 140 are spacing-regularly formed on the passivation layer 116 along the second direction, where each pixel electrode 140 is located between two neighboring first common electrodes 150, and each pair of the plurality of first common electrodes 150 is distantly located over a corresponding one of the plurality of date lines 130. In the exemplary embodiment shown in FIG. 1, each pixel electrode 140 and one of its two neighboring first common electrodes 150 define a distance, D, therebetween, which is greater than the cell gap H. As described below, the plurality of first common electrodes 150 can also be formed such that only a single common electrode is located over a corresponding one of the plurality of date lines 130. According to embodiments of the present invention, the plurality of first common electrodes 150 and the plurality of pixel electrodes 140 are located in a single plane (the passivation layer 116).

The insulation layer 112 is formed of an insulating material such as silicon nitride (SiNx), silicon oxide (SiOx) or silicon oxynitride (SiON), or the like. The passivation layer 116 is formed of SiNx, SiOx, SiON or organic insulating material such as polyimide, and has a thickness in the range of about 0.1-10.0 μm.

Each of the plurality of pixel electrodes 140 and the plurality of first common electrodes 150 is formed of a transparent, conductive material including indium zinc oxide (IZO), amorphous indium tin oxide (ITO), poly ITO, or the like, with a thickness in the range of about 0.01-3.0 μm. In one embodiment, the plurality of pixel electrodes 140 and the plurality of first common electrodes 150 are in a lattice shape.

The first alignment layer 118 is formed on the passivation layer 116 to cover the plurality of pixel electrodes 140 and the plurality of first common electrodes 150 thereon. The first alignment layer 118 has a rubbing axis with a pre-tilted angle in a range of about 0-10 degrees relative to the second direction so as to align the liquid crystals to a desired direction initially.

Additionally, the first structure 110 also includes a plurality of TFTs as switching elements (not shown). Each TFT is formed between a scanning line and a signal line that crosses the scanning line. The TFT includes a channel layer formed on the scanning line, a source electrode extending from the signal line and overlapped with one side of the channel layer by a selected portion, and a drain electrode overlapped with the other side of the channel layer by a selected portion and connected to the pixel electrode.

The second structure 120 includes a second substrate 122, a color filter layer 124, an overcoat layer 116, a second alignment layer 118, a black matrix 190, a plurality of floating electrodes 160, and a plurality of second common electrodes 170.

The second substrate 122 has a first surface 122a and an opposite, second surface 122b defining a body portion 122c therebetween. The black matrix 190 is formed on the first surface 122a of the second substrate 122 in a predetermined pattern. The color filter layer 124 is formed on the remaining portion of the second substrate 122. The overcoat layer 126 is formed on the color filter layer 124 and the black matrix 190. The plurality of second common electrodes 170 and the plurality of floating electrodes 160 are spacing-regularly formed on the overcoat layer 126 along the second direction, where each floating electrode 160 is located between two neighboring second common electrodes 170, and each pair of the plurality of second common electrodes 170 is distantly located under a corresponding portion of the black matrix 190.

Each of the plurality of floating electrodes 160 and the plurality of second common electrodes 170 is formed of a transparent, conductive material including IZO, amorphous ITO, poly ITO, or the like, with a thickness in the range of about 0.01-3.0 μm. In one embodiment, the plurality of floating electrodes 160 and the plurality of second common electrodes 170 are in a lattice shape.

The second alignment layer 128 is formed on the overcoat layer 126 to cover the plurality of floating electrodes 160 and the plurality of second common electrodes 170 thereon. The second alignment layer 128 has a rubbing axis with a pretilted angle in a range of about 0-10 degrees relative to the second direction so as to align the liquid crystals to a desired direction initially.

As shown in FIG. 1, the first structure 110 and the second structure 120 are positioned relative to each other such that a cell gap H is defined therebetween. Furthermore, each of the plurality of floating electrodes 160 in the second structure 120 is positioned opposite a corresponding one of the plurality of pixel electrodes 140 in the first structure 110, and each of the plurality of second common electrodes 170 in the second structure 120 is positioned opposite a corresponding one of the plurality of first common electrodes 150 in the first structure 110. Moreover, the black matrix 190 in the second structure 120 is positioned opposite the plurality of scanning lines and the plurality of signal lines 130 in the first structure 110.

Accordingly, a storage capacitor (not shown) is formed at an overlapped portion of the common electrode and the pixel electrodes. The storage capacitor holds data signal at a desired voltage level during one frame.

Additionally, the LCD device 100 also includes a polarizer and an analyzer (not shown). The polarizer is formed on the first surface 112a of the first substrate 112. The polarizer has a polarizing axis in a first predetermined direction where the polarizing axis is optically related to the liquid crystal layer 180. The analyzer is formed on the second surface 122b of the second substrate 122. The analyzer has an absorbing axis in a second predetermined direction, where the absorbing axis is optically related to the polarizer. The polarizing axis of the polarizer and the rubbing axis of the first alignment layer 118 define an angle in a range of about 0-90 degrees. The polarizing axis of the polarizer is about 90 degrees relative to the absorbing axis of the analyzer.

For such a configuration of the LCD device 100, when a signal voltage is applied to one of the transparent pixel electrodes 140, the voltage at the transparent pixel electrode 140 is coupled to the corresponding floating electrode 160, because the capacitance between the pixel electrode 140 and the floating electrode 160 is much larger than the capacitance between the pixel electrode 140 and the common electrode 150 (170). As a result, the liquid crystals 182 rotate according to an electric filed generated in the liquid crystal layer 180. The field for driving liquid crystals in the cell gap without dead zone is generated by the pixel electrode, floating electrode and common electrodes. Accordingly, the LCD device 100 is capable of operating with very high transmittance, wide viewing angle and fast response time.

FIG. 2(a) shows a dark state of light transmittance 284 from an LCD device, according to one embodiment of the present invention. The LCD device includes two first common electrodes 250 and a pixel electrode 240 distantly formed on a first substrate 210, two second common electrodes 270 and a floating electrode 260 distantly formed on a second substrate 220 that is positioned apart from the first substrate 210 to define a cell gap (a liquid crystal layer) 280 therebetween that is filled with liquid crystals 282. In the dark state, no electric field is generated in the liquid crystal layer 280. As a result, no light transmittance of light 284 is obtained from the LCD device. FIG. 2(b) shows a white state of light transmittance 286 from the LCD device showing equal potential lines 285 formed within the liquid crystal layer 280. Accordingly, the liquid crystals 282 can be oriented to desire directions due to the induced electric field 285 in the liquid crystal layer 280. The corresponding light transmittance curve 286 of the LCD device 200 indicates that the light transmittance is obtained over the pixel in the white state.

Figure 3:
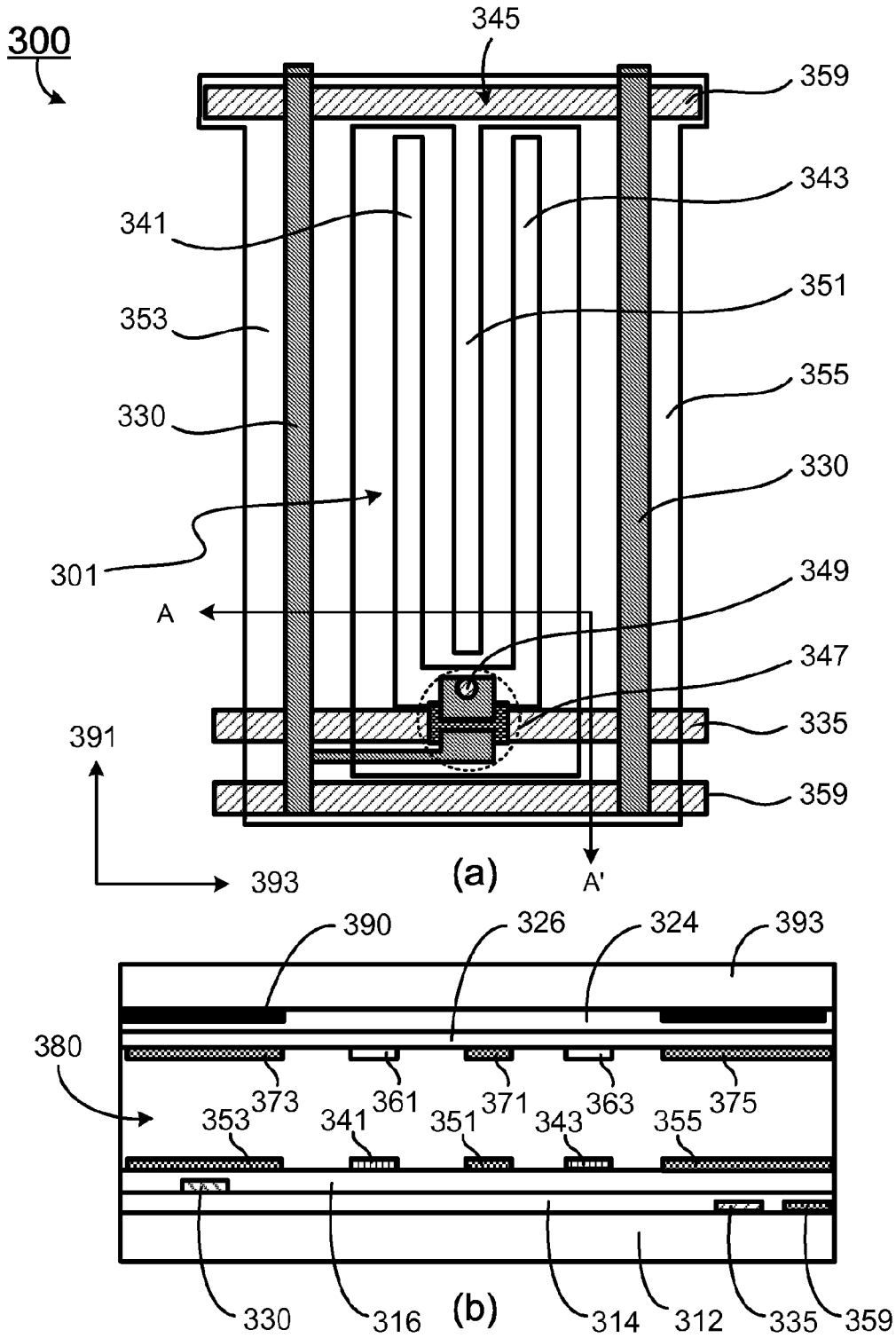
FIG. 3 shows schematically (a) a plane view of an LCD device and (b) a cross-sectional view of the LCD device along line A-A' according to one embodiment of the present invention.

Referring to FIG. 3, an LCD device 300 according to one embodiment of the present invention is schematically shown, where figure (a) is a plane view of a unit pixel of the LCD device 300 and figure (b) is a cross-sectional view of the LCD device 300 along line A-A'.

The LCD device 300 includes a first substrate 312, a gate insulating film 314 formed on the first substrate 312, and a plurality of scanning (gate) lines 335 and data (signal) lines 330, respectively, formed to cross each other and insulated by the gate insulating film 314, thereby defining a plurality of pixel regions 301 where they cross. The plurality of scanning lines 335 is formed along a first direction 391 and plurality of signal lines 330 is formed along a second direction 393 that is substantially perpendicular to the first direction 391. Additionally, a plurality of common bus lines 359 is also formed on the first substrate 312 with each common bus line 359 adjacent to a corresponding scanning line 335. A passivation layer 316 is formed on the gate insulating film 314 to cover the plurality of signal lines 330.

Furthermore, the LCD device 300 includes a plurality of pixel electrodes 341 and 343, and a plurality of first common electrodes 351, 353 and 355 spacing-regularly and alternatively formed on the passivation layer 316. In this exemplary embodiment shown in FIG. 3, each pixel region 301 includes two pixel electrodes 341 and 343 and three first common electrodes 351, 353 and 355. The first common electrodes 353 and 355 are formed on the passivation layer 316 in regions over the corresponding signal line 330 and scanning line 335, respectively, while the first common electrode 351 is formed between the first common electrodes 353 and 355 on the passivation layer 316. The pixel electrode 341 is formed between the first common electrodes 353 and 351 on the passivation layer 316, while the pixel electrode 343 is formed between the first common electrodes 351 and 355 on the passivation layer 316.

The pixel region 301 also includes a TFT 347. It is used as a switching element and formed between the gate line 335 and the signal line 330. For example, the TFT 347 includes a gate electrode extending from the gate line 335, a gate insulating film 314 formed on the gate electrode, a channel layer (not shown) formed on the gate insulating film 314 above the gate electrode, a source electrode extending from the signal line 330 and overlapped with one side of the channel layer by a selected portion, and a drain electrode overlapped with the other side of the channel layer by a selected portion and connected to the pixel electrodes 341 and 343. The TFT 347 is capable of transmitting signals applied to the signal line 330 to the pixel electrodes 341 and 343 in response to a signal applied to the gate line 335.

Furthermore, the LCD device 300 include a second substrate 322, a black matrix 390 formed on the second substrate 322 in a predetermined pattern, a color filter film 324 formed on the remaining portion of the second substrate 322, an overcoat layer 326 formed on the black matrix 390 and the color filter film 326, and a plurality of second common electrodes 371, 373 and 375, and a plurality of floating electrodes 371 spacing-regularly and alternatively formed on the overcoat layer 326.

As shown in FIG. 3, each pixel region 301 includes two floating electrodes 361 and 363 and three second common electrodes 371, 373 and 375. The second common electrodes 373 and 375 are formed on the overcoat layer 326 in regions under the corresponding portion of the black matrix 390, while the second common electrode 371 is formed between the second common electrodes 373 and 375 on the overcoat layer 326. The floating electrode 361 is formed between the second common electrodes 373 and 371 on the overcoat layer 326, while the floating electrode 363 is formed between the second common electrodes 371 and 375 on the overcoat layer 326.

The second substrate 322 is positioned apart from the first substrate 312 to define a cell gap therebetween for receiving a liquid crystal layer 380. Furthermore, the first substrate 312 and the second substrate 322 are positioned relative to each other such that for each pixel region 301, the floating electrodes 361 and 363 in the second substrate 371 are positioned opposite the corresponding pixel electrodes 341 and 342 in the first substrate 312, respectively. The second common electrodes 371, 373 and 375 in the second substrate 322 are positioned opposite the corresponding first common electrodes 351, 353 and 357 in the first substrate 312, respectively. Additionally, the black matrix 190 in the second substrate 322 is positioned opposite the corresponding scanning lines 335 and signal lines 130 in the first substrate 312. Accordingly, a storage capacitor 345 is formed at an overlapped portion of the common electrode and the pixel electrodes. The storage capacitor 345 holds data signal at a desired voltage level during one frame.

FIG. 4-7 shows various embodiments of the LCD device 400, 500, 600 or 700 according to the present invention. Each embodiment of the LCD device includes a unique configuration of common electrodes, pixel electrodes and floating electrodes formed on the first and second substrates.

Figure 4:
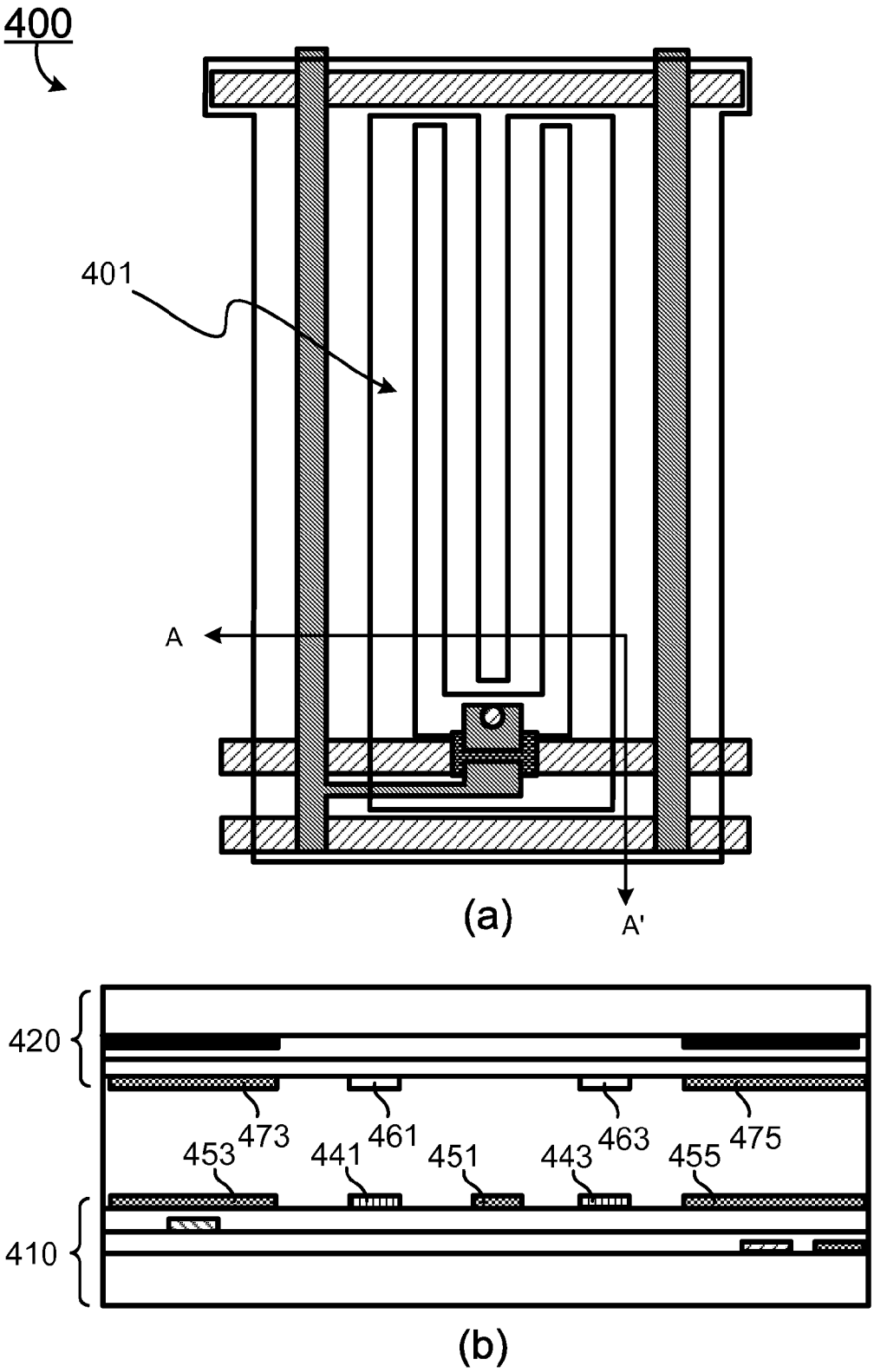
FIG. 4 shows schematically (a) a plane view of an LCD device and (b) a cross-sectional view of the LCD device along line A-A' according to another embodiment of the present invention.

For example, in the embodiment shown in FIG. 4, each pixel region 401 has two pixel electrodes 441 and 443, and three first common electrodes 451, 453 and 455 formed on the first structure 410, which are in a same configuration as these in FIG. 3, and two floating electrodes 461 and 462 and two second common electrodes 473 and 475 formed on a second structure 420. Comprising to the LCD device shown in FIG. 3, no second common electrode is formed between the floating electrodes 461 and 463 on the second substrate in the LCD device 400. For such a configuration, the LC efficiency (transmittance) of the LCD device 400 may be slightly lower than that of the LCD shown in FIG. 3. But it can reduce short defect between common electrodes and floating electrodes by fabrication process.

Figure 5:
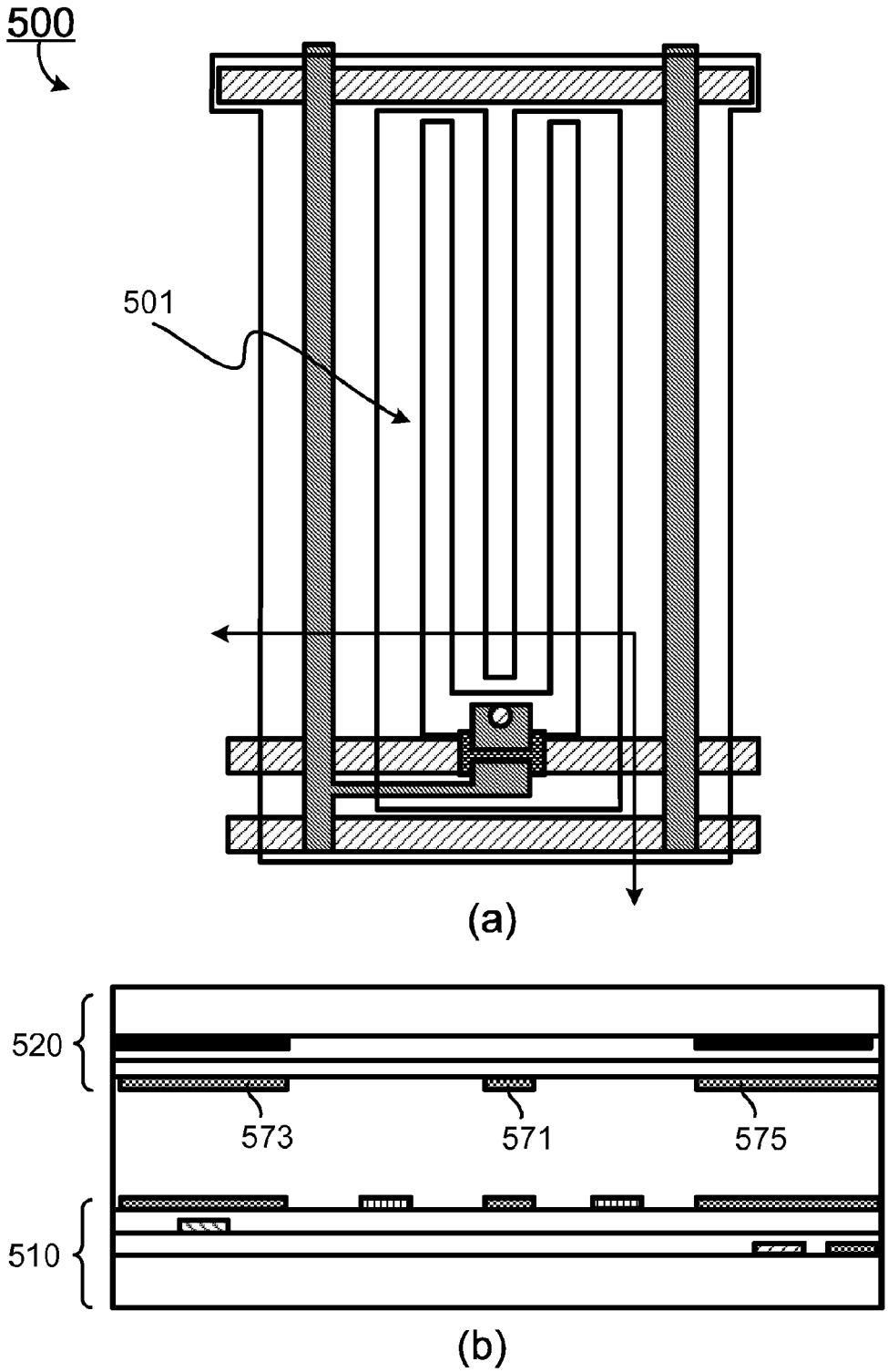
FIG. 5 shows schematically (a) a plane view of an LCD device and (b) a cross-sectional view of the LCD device along line A-A' according to yet another embodiment of the present invention.

In the embodiment shown in FIG. 5, each pixel region 501 has three second common electrodes 571, 573 and 575 and no floating electrode formed on a second structure 520. Similarly, such a configuration of the LCD device 500 may reduce slightly the LC efficiency (transmittance), comparing to the LCD shown in FIG. 3, but it can reduce short defect between common electrodes and floating electrodes by fabrication process.

Figure 6:
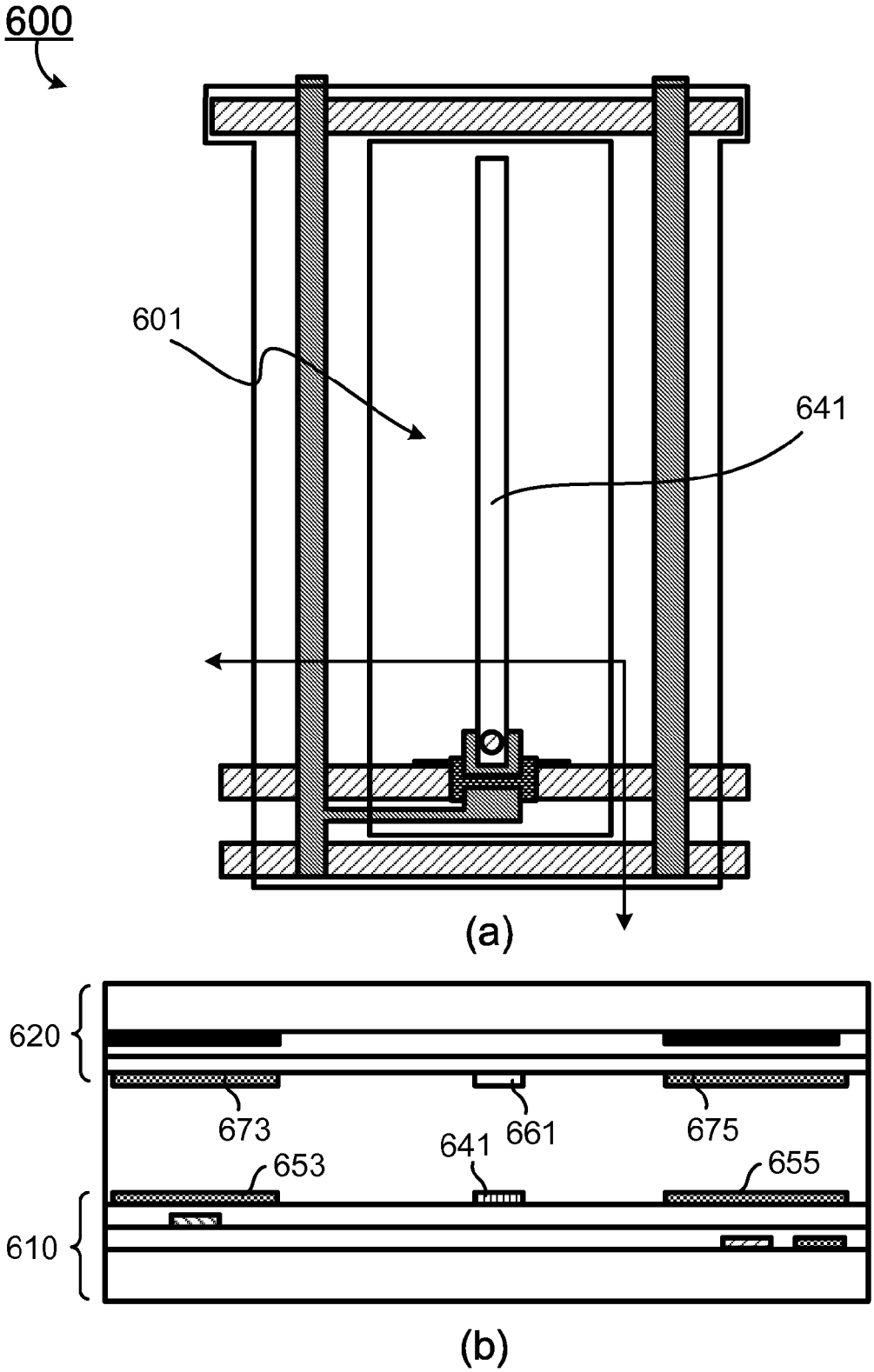
FIG. 6 shows schematically (a) a plane view of an LCD device and (b) a cross-sectional view of the LCD device along line A-A' according to an alternative embodiment of the present invention.

In the embodiment shown in FIG. 6, each pixel region 601 has two first common electrodes 653 and 655 and a pixel electrode 641 formed on the first structure 610, and two second common electrodes 673 and 675 and a floating electrode 661 formed on a second structure 620. The pixel electrode 641 is located between two first common electrodes 653 and 655, while the floating electrode 661 is located between two second common electrodes 673 and 675. In the embodiment, the aperture ratio of pixels is improved, but driving voltage is little higher than that of the LCD device shown in FIG. 3.

Figure 7:
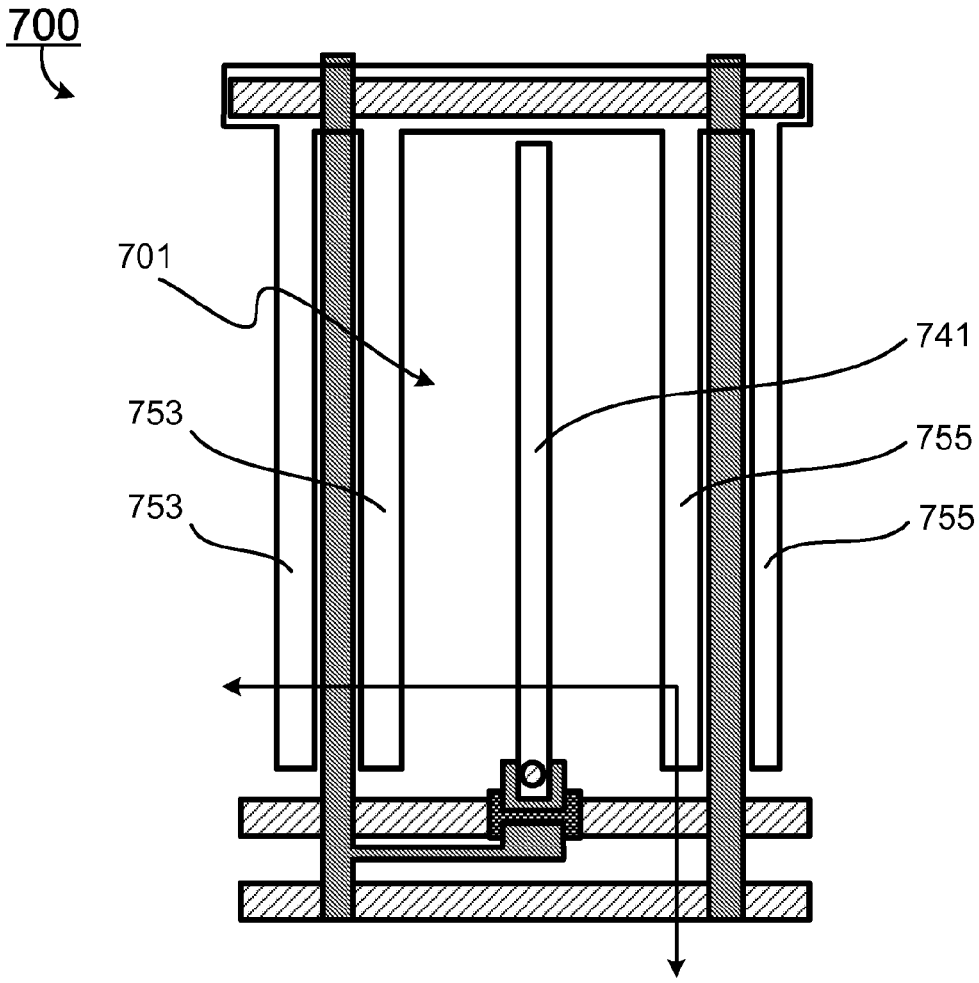
FIG. 7 shows schematically (a) a plane view of an LCD device and (b) a cross-sectional view of the LCD device along line A-A' according to one embodiment of the present invention.
Figure 7:
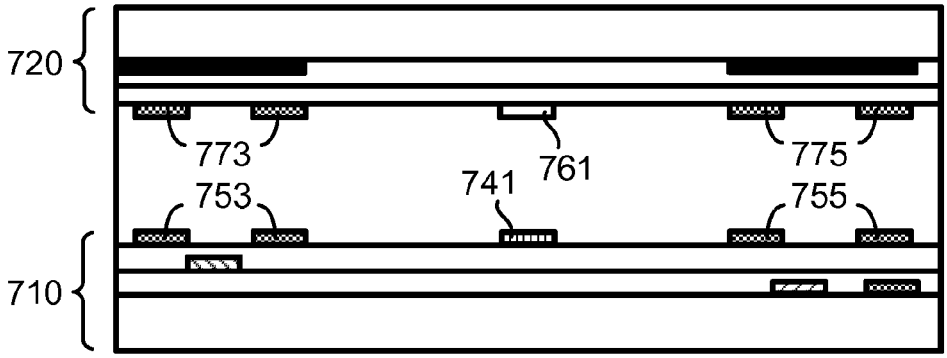

The LCD device shown in FIG. 7 is same as that of FIG. 1, where in each pixel region 701, a pixel electrode 741 and two pairs of first common electrodes 753 and 755 formed on the first structure 710, a floating electrode 761 and two second common electrodes 773 and 775 formed on the second structure 720. Each pair of the first and second common electrodes is located in a region over a corresponding signal line. Accordingly, it can reduce RC delay of signal line by reducing of overlap capacitance between common electrodes and signal electrodes, but it may increase signal noise to pixel electrodes.

Figure 8:
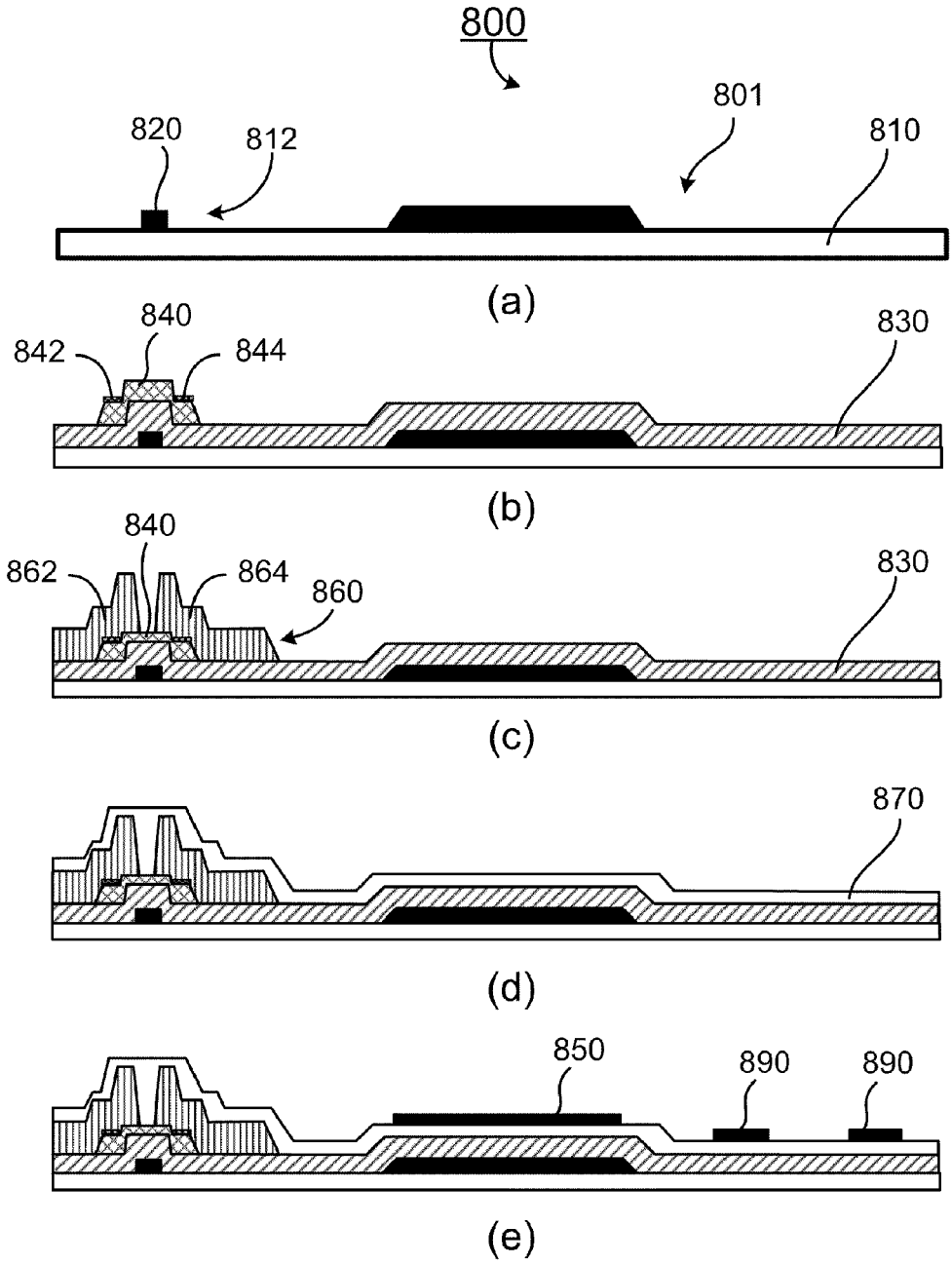
FIG. 8 shows schematically fabricating processes (steps) (a)-(e) of an LCD device according to one embodiment of the present invention.
Figure 9:
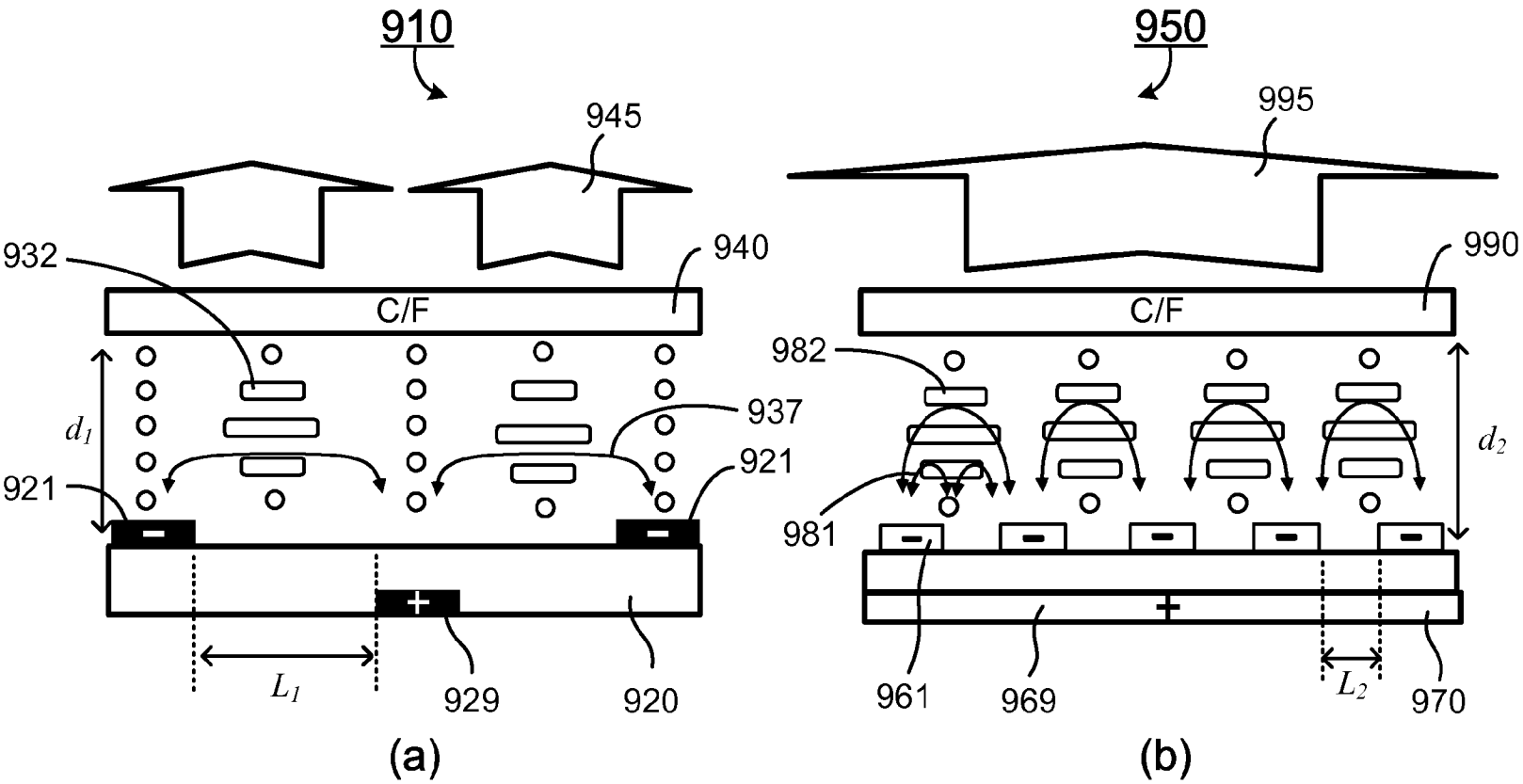
Fig. 9 (Related Art)
FIG. 9 shows schematically a cross-sectional view of (a) in-plane switching (IPS) and (b) fringe field switching (FFS) LCD devices.

Referring now to FIG. 8, a method 800 of fabricating the invented LCD device is schematically shown according to one embodiment of the present invention. The method includes the following steps. At first, a first substrate 810 is provided. The first substrate 810 is formed of glass, or the likes. Then, a plurality of gate electrodes 820 electrically coupled to a gate line is formed spatially apart from one another on the first substrate 810. Each pair of adjacent gate electrodes 820 defining a pixel area 801 and a capacitor area 802 therebetween, where the pixel area 801 is adjacent to a switching area 812 in which a corresponding gate electrode 820 is formed, as shown in FIG. 8(a). The gate electrode 820 is formed of a metal such as aluminum (Al), molybdenum (Mo), chromium (Cr), tantalum (Ta), copper (Cu), multilayer or alloy.

A dielectric layer (gate insulation film) 830 is formed on the first substrate 810 and the plurality of gate electrodes 820. The gate insulation film 830 is formed of SiNx, SiOx, or SiON. In one embodiment, the gate insulation film 830 is formed in such a manner that SiNx or SiOx is deposited on the first substrate 810 and the plurality of gate electrodes 820 by plasma enhancement chemical vapor deposition (PECVD).

A semiconductor layer 840 is then formed on the gate insulation film 830 in each switching area 812. Subsequently, a contact layer 845 is formed on the semiconductor layer 840 and patterned to have a first contact portion 842 and a second contact portion 844 separated from the first contact portion 842, as shown in FIG. 8(b). The semiconductor layer 840 comprises an amorphous silicon or a poly silicon, or the likes. The contact layer 845 is formed of a doped amorphous silicon such as $n^+$ doped a-Si or $p^+$ doped a-Si. In one embodiment, the semiconductor layer 840 and the contact layer 845 are formed in such a manner that the amorphous silicon (a-Si) and the doped amorphous silicon ($n^+$ doped a-Si or $p^+$ doped a-Si) are successively deposited by PECVD and then patterned.

Alternatively, the gate insulation film 830 of SiNx or SiOx, the amorphous silicon layer 840, and the doped amorphous silicon layer 845 may sequentially be deposited, and the amorphous silicon layer 840 and the doped amorphous silicon layer 845 may be patterned to form the semiconductor layer 840 and the contact layer 845.

Afterwards, a metal layer 860 is formed on the semiconductor layer 840 and the contact layer 845 in each switching area 812. The metal layer 860 is patterned to have a first portion 862 that is connected to a signal line and a second portion 864 that is separated from the first portion 862 and connected to the first pixel electrode layer 850 in a corresponding pixel area 801, as shown in FIG. 8(c).

As shown in FIG. 8(d), a passivation layer (film) 870 is then formed of a dielectric material such as SiNx or SiOx on the metal layer 860 in each switching area 812 and each pixel area 801, which defines a via hole for coupling the switching device with the pixel electrode.

The next step, as shown in FIG. 8(e), is to form one or more pixel electrodes 880 and two or more first common electrodes 850, 890 on the passivation layer 870 in each pixel area 801, which are formed of a transparent, conductive material including IZO, amorphous ITO, poly ITO, or the like, with a thickness in the range of about 0.01-3.0 μm.

Additionally, the method further includes the steps of providing a second substrate facing the first substrate and forming two or more second common electrodes and/or one or more floating electrodes on the second substrate. The liquid crystals are injected into the liquid crystal layer defined between the first substrate and the second substrate. The liquid crystals have a positive dielectric anisotropy.

The present invention, among other things, discloses an LCD device that utilizes the FES to improve image quality with viewing angle characteristic and light transmittance of display. According to the embodiments of the present invention, the LCD device has a plurality of transparent first common electrodes and pixel electrodes formed on a first substrate, and a plurality of second transparent common electrodes and/or floating electrodes formed on a second substrate second substrate, where the first substrate and the second substrate are positioned relative to each other such that each second transparent common electrode on the second substrate is opposite a corresponding transparent first common electrodes on a first substrate, and each floating electrode on the second substrate second substrate is opposite a corresponding pixel electrode on the first substrate.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) device, comprising:

a. a first structure comprising:

i. a first substrate having a first surface and an opposite, second surface defining a body portion therebetween;

ii. a plurality of scanning lines regularly spaced and formed on the second surface of the first substrate along a first direction;

iii. an insulation layer formed on the first substrate covering the plurality of scanning lines;

iv. a plurality of signal lines regularly spaced and formed on the insulation layer crossing over the plurality of scanning lines along a second direction that is substantially perpendicular to the first direction;

v. a passivation layer formed on the insulation layer covering the plurality of signal lines thereon;

vi. a plurality of first common electrodes regularly spaced and formed on the passivation layer along the second direction; and vii. a plurality of pixel electrodes regularly spaced and formed on the passivation layer along the second direction, each of the pixel electrodes located between two neighboring first common electrodes;

b. a second structure comprising:

i. a second substrate having a first surface and an opposite, second surface defining a body portion therebetween;

ii. a black matrix formed on the first surface of the second substrate directly facing the plurality of scanning lines and the plurality of signal lines in the first structure;

iii. a color filter layer formed on the remaining portion of the second substrate;

iv. an overcoat layer formed on the color filter layer and the black matrix;

v. a plurality of second common electrodes regularly spaced and formed on the overcoat layer along the second direction, each of the plurality of second common electrodes directly facing a corresponding one of the plurality of first common electrodes on the first substrate; and vi. a plurality of floating electrodes regularly spaced and formed on the overcoat layer on the second substrate along the second direction, each of the plurality of floating electrodes directly facing a corresponding one of the plurality of pixel electrodes on the first substrate;

wherein the first structure and the second structure are positioned relative to each other such that a cell gap is defined therebetween; *and* c. a liquid crystal layer having a plurality of liquid crystal molecules, the liquid crystal layer being positioned in the cell gap between the first structure and the second structure;

wherein each of the plurality of floating electrodes is electrically [disconnected from] *floating and is not directly electrically connected to* the pixel electrodes, the first common electrodes, and the second common electrodes, such that, when a signal voltage is applied to a pixel electrode, the voltage is coupled to a corresponding floating electrode via the capacitance between the pixel electrode and the floating electrode, thereby inducing an electric field in the liquid crystal layer in the region between the pixel electrode, the floating electrode, the first common electrodes and the second common electrodes, and wherein the liquid crystal molecules in the region are rotated according to the electric field.

2. The LCD device of claim 1, wherein the liquid crystal layer comprises nematic liquid crystals having a positive dielectric anisotropy.

3. The LCD device of claim 2, wherein the liquid crystals are selected such that a product of the refractive index $\delta_n$ of the liquid crystals and the cell gap is in a range of about 0.15-0.60 μm.

4. The LCD device of claim 1, wherein each of the pixels electrode and one of its two neighboring first common electrodes define a distance therebetween, which is greater than the cell gap.

5. The LCD device of claim 1, wherein the first structure further comprises a first alignment layer formed on the passivation layer covering the plurality of pixel electrodes and the plurality of first common electrodes thereon, and wherein the second structure further comprises a second alignment layer formed on the overcoat layer covering the plurality of floating electrodes and the plurality of second common electrodes thereon.

6. The LCD device of claim 5, wherein each of the first alignment layer and the second alignment layer is formed to have a rubbing axis with a pre-tilted angle in a range of about 0-10 degrees relative to the second direction so as to align the liquid crystals to a desired direction.

7. The LCD device of claim 6, further comprising:

a. a polarizer formed on the first surface of the first substrate, the polarizer having a polarizing axis in a first predetermined direction, the polarizing axis being optically related to the liquid crystal layer; and b. an analyzer formed on the second surface of the second substrate, the analyzer having an absorbing axis in a second predetermined direction, the absorbing axis being optically related to the polarizer.

8. The LCD device of claim 7, wherein the polarizing axis of the polarizer and the rubbing axis of the first alignment layer define an angle in a range of about 0-90 degrees, and wherein the polarizing axis of the polarizer is about 90 degrees relative to the absorbing axis of the analyzer.

9. The LCD device of claim 1, wherein each of the plurality of first common electrodes is located over a corresponding one of the plurality of signal lines.

10. The LCD device of claim 1, wherein each pair of the plurality of first common electrodes is distantly located over a corresponding one of the plurality of signal lines.

11. The LCD device of claim 1, wherein each of the plurality of pixel electrodes, the plurality of floating electrodes, the plurality of first common electrodes and the plurality of second common electrodes is formed of a transparent, conductive material including indium zinc oxide (IZO), amorphous indium tin oxide (ITO), poly ITO, or any combination of them, with a thickness in the range of about 0.01-3.0 μm.

12. A liquid crystal display (LCD) device, comprising:

a. a first substrate and a second substrate positioned apart to define a cell gap therebetween;

b. a liquid crystal layer having a plurality of liquid crystal molecules, the liquid crystal layer being positioned in the cell gap between the first substrate and the second substrate;

c. a plurality of scanning lines formed on the first substrate along a first direction and a plurality of signal lines formed on the first substrate crossing over the plurality of scanning lines along a second direction that is perpendicular to the first direction; and d. a plurality of pixels, each of the pixels being defined between two neighboring scanning lines and two neighboring signal lines crossing over the two neighboring scanning lines and comprising:

i. an insulation layer formed on the first substrate;

ii. two or more first common electrodes formed on the insulation layer along the second direction, two of the two or more first common electrodes located over the two neighboring signal lines, respectively;

iii. one or more pixel electrodes formed on the insulation layer between the two of the two or more first common electrodes along the second direction;

iv. a black matrix formed on the second substrate in locations directly facing the two neighboring scanning lines and the two neighboring signal lines crossing over the two neighboring scanning lines in the first substrate;

v. a color filter layer formed on the second substrate in an area surrounded by the black matrix;

vi. an overcoat layer formed on the black matrix and the color filter;

vii. two or more second common electrodes formed on the overcoat layer along the second direction, the two or more second common electrodes directly facing corresponding two or more first common electrodes on the first substrate; and viii. at least one of one or more floating electrodes formed on the overcoat layer on the second substrate along the second direction in locations directly facing corresponding ones of the one or more pixel electrodes formed on the first substrate;

wherein the at least one of one or more floating electrodes is electrically [disconnected from] *floating and is not directly electrically connected to* the pixel electrodes, the first common electrodes, and the second common electrodes, such that, when a signal voltage is applied to a pixel electrode, the voltage is coupled to a corresponding floating electrode via the capacitance between the pixel electrode and the floating electrode, thereby inducing an electric field in the liquid crystal layer in the region between the pixel electrode, the floating electrode, the first common electrodes and the second common electrodes, and wherein the liquid crystal molecules in the region are rotated according to the electric field.

13. The LCD device of claim 12, wherein the liquid crystal layer comprises nematic liquid crystals having a positive dielectric anisotropy.

14. The LCD device of claim 13, wherein the liquid crystals are selected such that a product of the refractive index $\delta_n$ of the liquid crystals and the cell gap is in a range of about 0.15-0.60 μm.

15. The LCD device of claim 12, wherein each of the pixels further comprises a switch device electrically coupled with the one or more pixel electrodes.

16. The LCD device of claim 12, wherein each of the pixels further comprises:

a. a first alignment layer formed on the passivation layer covering the plurality of pixel electrodes and the plurality of first common electrodes thereon; and b. a second alignment layer formed on the overcoat layer covering the plurality of floating electrodes and the plurality of second common electrodes thereon.

17. The LCD device of claim 16, wherein each of the first alignment layer and the second alignment layer is formed to have a rubbing axis with a pre-tilted angle in a range of about 0-10 degrees relative to the second direction so as to align the liquid crystals to a desired direction.

18. The LCD device of claim 17, further comprising:

a. a polarizer formed on an exterior surface of the first substrate, the polarizer having a polarizing axis in a first predetermined direction, the polarizing axis being optically related to the liquid crystal layer; and b. an analyzer formed on an exterior of the second substrate, the analyzer having an absorbing axis in a second predetermined direction, the absorbing axis being optically related to the polarizer.

19. The LCD device of claim 18, wherein the polarizing axis of the polarizer and the rubbing axis of the first alignment layer define an angle in a range of about 0-90 degrees, and wherein the polarizing axis of the polarizer is about 90 degrees relative to the absorbing axis of the analyzer.

20. A liquid crystal display (LCD) device, comprising:

a. a first substrate and a second substrate positioned apart from the first substrate;

b. a liquid crystal layer having a plurality of liquid crystal molecules, the liquid crystal layer being positioned between the first substrate and the second substrate; and c. a plurality of pixels, each of the pixels comprising:

i. two or more first common electrodes formed on the first substrate;

ii. one or more pixel electrodes formed on the first substrate, each of the one or more pixel electrodes located between two of the two or more first common electrodes;

iii. two or more second common electrodes formed on the second substrate in locations directly facing corresponding ones of the two or more first common electrodes on the first substrate; and iv. at least one of one or more floating electrodes formed on the second substrate in locations directly facing corresponding ones of the one or more pixel electrodes on the first substrate;

wherein the at least one of one or more floating electrodes is electrically [disconnected from] *floating and is not directly electrically connected to* the pixel electrodes, the first common electrodes, and the second common electrodes, such that, when a signal voltage is applied to a pixel electrode, the voltage is coupled to a corresponding floating electrode via the capacitance between the pixel electrode and the floating electrode, thereby inducing an electric field in the liquid crystal layer in the region between the pixel electrode, the floating electrode, the first common electrodes and the second common electrodes, and wherein the liquid crystal molecules in the region are rotated according to the electric field.

21. The LCD device of claim 20, wherein the liquid crystal layer comprises nematic liquid crystals having a positive dielectric anisotropy.

22. The LCD device of claim 20, wherein each of the pixels further comprises a switch device electrically coupled with the one or more pixel electrodes.

23. The LCD device of claim 20, wherein each of the pixels further comprises:

a. a first alignment layer formed on the plurality of pixel electrodes and the plurality of first common electrodes thereon; and b. a second alignment layer formed on the plurality of floating electrodes and the plurality of second common electrodes thereon.

24. The LCD device of claim 23, wherein each of the first alignment layer and the second alignment layer is formed to have a rubbing axis with a pre-tilted angle in a range of about 0-10 degrees relative to the direction of the one or more pixel electrodes so as to align the liquid crystals to a desired direction.

25. A liquid crystal display (LCD) device, comprising:

a. a first substrate and a second substrate positioned apart from the first substrate;

b. a liquid crystal layer positioned between the first substrate and the second substrate, the liquid crystal layer having a plurality of liquid crystal molecules; and c. a plurality of pixels, each of the pixels comprising:

i. two or more first common electrodes formed on the first substrate;

ii. one or more pixel electrodes formed on the first substrate, each of the one or more pixel electrodes located between two of the two or more first common electrodes;

iii. two or more second common electrodes formed on the second substrate in locations directly facing corresponding ones of the two or more first common electrodes on the first substrate; and iv. at least one floating electrode formed on the second substrate in locations directly facing a corresponding one of the one or more pixel electrodes on the first substrate;

wherein the at least one floating electrode is electrically [disconnected from] *floating and is not directly electrically connected to* the pixel electrodes, the first common electrodes, and the second common electrodes, such that, when a signal voltage is applied to a pixel electrode, the voltage is coupled to a corresponding floating electrode via the capacitance between the pixel electrode and the floating electrode, thereby inducing an electric field in the liquid crystal layer in the region between the pixel electrode, the floating electrode, the first common electrodes and the second common electrodes, and wherein the liquid crystal molecules in the region are rotated according to the electric field.

* * * * *